United States Patent [19]

Takahashi, deceased

[11] Patent Number: 5,057,943
[45] Date of Patent: Oct. 15, 1991

[54] IMAGE SCANNING APPARATUS

[75] Inventor: Kazuhisa Takahashi, deceased, late of Yokohama, Japan, by Reiko Takahashi, legal representative

[73] Assignee: Canon Kabushiki Kaisha, Tokyo, Japan

[21] Appl. No.: 534,240

[22] Filed: Jun. 7, 1990

[30] Foreign Application Priority Data

Jun. 9, 1989 [JP] Japan ................................ 1-148001

[51] Int. Cl.⁵ .............................................. H04N 1/10
[52] U.S. Cl. ..................................... 358/496; 358/474
[58] Field of Search ............... 358/474, 481, 486, 496, 358/225, 213.13

[56] References Cited

U.S. PATENT DOCUMENTS

| | | | |
|---|---|---|---|
| 4,285,012 | 8/1981 | Ohara et al. | 358/293 |
| 4,698,648 | 10/1987 | Takahashi et al. | 346/108 |
| 4,816,920 | 3/1989 | Paulsen | 358/474 |
| 4,893,136 | 1/1990 | Curry | 358/474 |
| 4,924,321 | 5/1990 | Miyagawa et al. | 358/496 |
| 4,943,871 | 7/1990 | Miyagawa | 358/496 |

FOREIGN PATENT DOCUMENTS 62-11326 3/1987 Japan .

Primary Examiner—Stephen Brinich
Attorney, Agent, or Firm—Fitzpatrick, Cella, Harper & Scinto

[57] ABSTRACT

An image recording/reproducing device for recording and/or reading an image through a two-dimensional scanning of an object with a light beam using a main scanning and a sub-scanning performed by a main scanning device and a subscanning device. the sub-scanning is stopped in an effective period of the main scanning so as to enable recording or reading of the image and is actuated in the blanking period other than the effective period. A very high precision of sub-scanning is attained without being influenced by any fluctuation in the speed of operation of the sub-scanning device.

14 Claims, 6 Drawing Sheets

FIG. 1

IMAGE SIGNAL

IMAGE SCANNING APPARATUS

BACKGROUND OF THE INVENTION

1. Field of the Invention

The present invention relates to an image scanning apparatus which conducts a two-dimensional scanning of an object with a light beam so as to record or read an image and, more particularly, to a two-dimensional image scanning apparatus suitable for use in, for example, the medical field in which the requirement for accuracy of image recording and reading is specifically high.

2. Description of the Related Art

Hitherto, a two-dimensional scanning apparatus has been known which conducts a main scanning by oscillating a light beam unidirectionally by means of an optical scanning system while conducting sub-scanning by moving the scanned surface in a direction substantially perpendicularly to the direction of the main scanning. In this type of scanning apparatus, a constant scanning pitch cannot be obtained unless the sub-scanning is conducted at a constant speed, even if the main scanning is performed at a constant period. In fact, the quality of the recorded or read image is often impaired due to fluctuation in the movement of the scanned surface. It is said that even about 0.1% fluctuation in the pitch of the main scanning line is visually recognized and, hence, cannot be accepted when there is a strict demand for high image quality.

Figure 7:
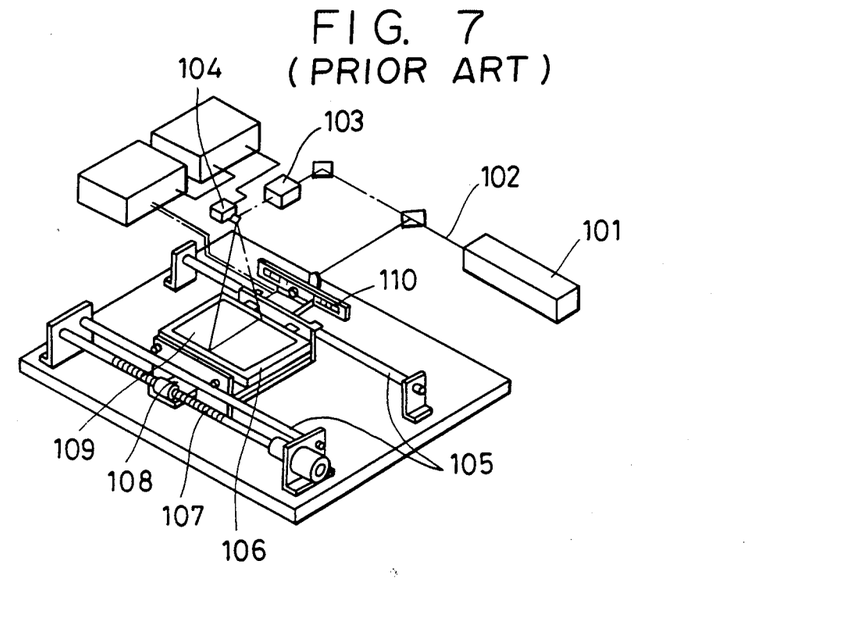
FIGS. 7 and 8 are illustrations of known arrangements.

Various methods have been proposed to reduce movement fluctuation for the purpose of attaining higher accuracy of the pitch of the main scanning. For instance, Japanese Patent Examined Publication No. 62-11326 discloses an optical beam scanning apparatus in which, as shown in FIG. 7, a beam 102 from a laser oscillator 101 is modulated by means of an acousto-optical (A/0) modulator 103 and is deflected by a light deflector 104 so as to effect main scanning, while a table 106 held by guide bars 105 is fed by means of feed screws 107,108 so as to effect sub-scanning, wherein fluctuation in the sub-scanning speed is reduced in the following manner. Namely, a linear encoder 110 having a high precision or resolution is fixed on the table 106 and the movement of the linear encoder is photoelectrically detected to produce a signal each time the table 106 has moved a predetermined distance. The light deflector 104 for effecting the main scanning is operated in synchronization with this signal. According to this method, the precision of the pitch of the main scanning is determined by the resolution of the encoder, regardless of the precision of the mechanical feed of the table. It is thus possible to conduct the sub-scanning with a high precision by enhancing the resolution of the linear encoder.

This known scanning apparatus employs, as the light reflector, a sonic-optical deflection element, an electro-optical deflection element or an oscillating mirror such as a galvano-mirror. An oscillatory mirror such as a galvano-mirror is most stable when it oscillates at its resonance frequency. Therefore, when a galvano-mirror is used in the above-described optical scanning apparatus, the galvano-mirror tends to fail to operate with good response to the signal which is generated per unit movement of the table, with the result that the deflected beam cannot scan an original on the table at a constant speed. Such a variation in the main scanning speed causes defects such as local thickening or winding of the main scanning line, thus causing an uneven main scanning. On the other hand, a sonic-optical light deflecting element and an electro-optical light deflecting element can provide only a small deflection angle of 2° to 3° and, hence, are not suitable for reading or recording a large image.

Figure 8:
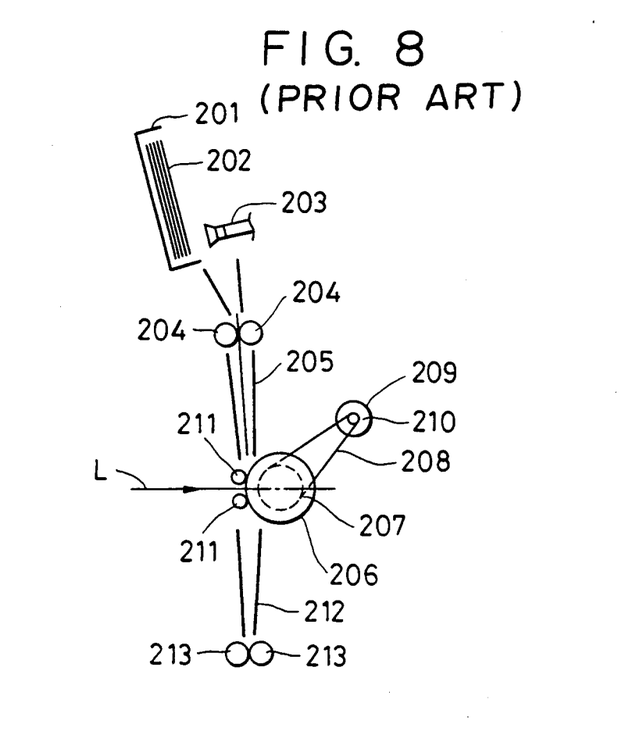

FIG. 8 shows another proposed arrangement for reducing fluctuation in feeding speed. In this arrangement, a sub-scanning roller 206 is driven by a sub-scanning motor 209 through a belt 208 which is stretched between a pulley 207 fixed to the sub-scanning roller 206 and a pulley 210 fixed to the shaft of the sub-scanning motor 209 and which is capable of transmitting the torque of the motor from the pulley 210 to the pulley 207 while reducing the speed. Numeral 211 denotes nip rollers for pressing the recording sheet onto the sub-scanning roller 206 so as to stabilize the recording position of the recording sheet, 205, 212 denote guide plates, 204, 213 denote feed rollers which are arranged at positions where they do not engage the recording sheet when recording is being conducted on the recording sheet. An optical scanning system, (not shown) is capable of scanning the recording sheet with a light beam indicated by L. In this apparatus, fluctuation in the feed speed is reduced by the same principle as that used in known systems for driving a turntable of a record player. Namely, the sub-scanning roller 206 with a good balance of mass is driven by a motor 209 through a speed reducing transmission means the soft and flexible belt of which well absorbs jitter of the motor.

The use of the soft and flexible belt 208 for driving the sub-scanning roller 206, however, has a drawback in that the precision of rotation of the sub-scanning roller tends to be adversely affected by external factors such as vibration, change in the load acting on the sub-scanning roller, and so forth. Therefore, a specific measure is required such as positioning of the feed rollers 204,213 so as not to engage the recording sheet during recording, and so forth, resulting in an increase in the size of the apparatus.

SUMMARY OF THE INVENTION

Accordingly, an object of the present invention is to provide an optical beam scanning apparatus having a compact and precise sub-scanning means which exhibits high stability against external factors such as vibration, load fluctuation and so forth.

To this end, according to the present invention, there is provided an image scanning apparatus comprising: light source means capable of generating a light beam; main scanning means for conducting a main scanning of an object surface with the light beam through a light beam scanning optical system including a rotary or oscillatory mirror; sub-scanning means for moving the object surface in a direction which crosses the direction of the main scanning; period setting means for setting an effective period in which an effective region on the object surface is scanned by the light beam from the light beam scanning optical system and an ineffective period in which the light beam scans a an ineffective region other than the effective region; and control means for maintaining the sub-scanning means inoperative in the effective period to enable recording or reading of an image and allowing the sub-scanning means to operate in the ineffective period thereby effecting the sub-scanning in the ineffective period.

The above and other objects, features and advantages of the present invention will become clear from the following description of the preferred embodiments when the same is read in conjunction with the accompanying drawings.

DESCRIPTION OF THE PREFERRED EMBODIMENT

An image recording apparatus as an embodiment of the present invention will be described with reference to the accompanying drawings.

Figure 1:
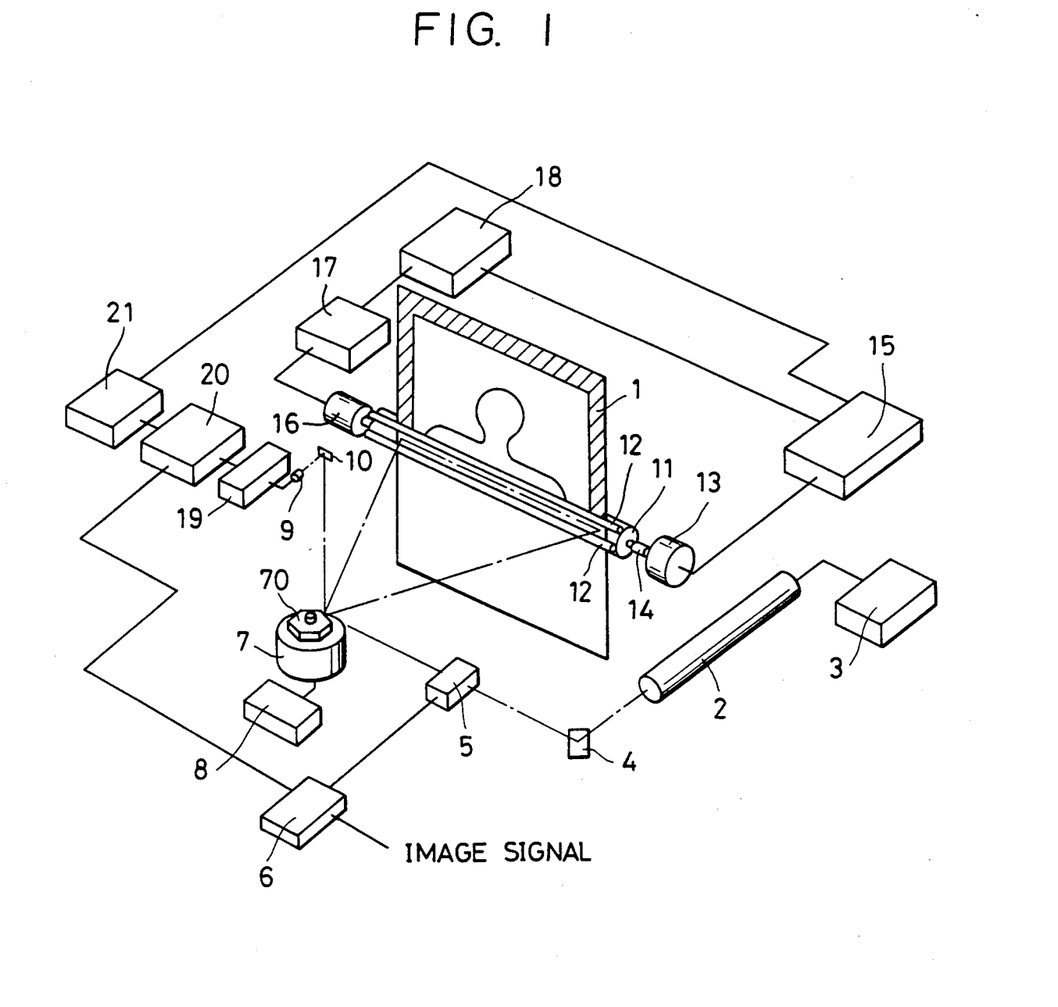
FIG. 1 is a schematic illustration of the construction of an embodiment of the present invention.

FIG. 1 is a schematic illustration of an embodiment which records a two-dimensional image by a combination of a main scanning conducted by an optical scanning system and a sub-scanning conducted by feeding the recording sheet in a direction substantially perpendicular to the direction of the main scanning.

Figure 3:
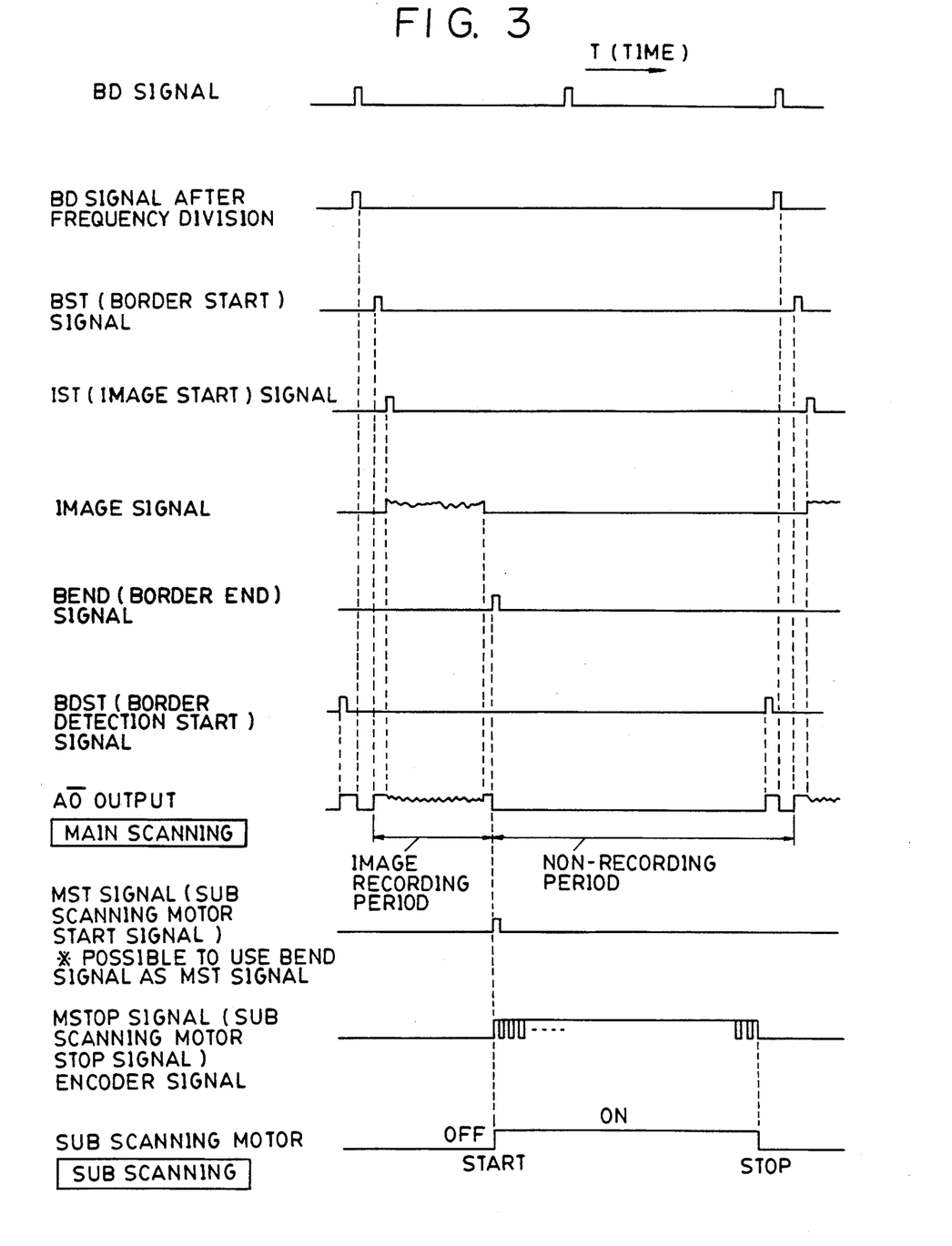
FIG. 3 is a timing chart illustrative of the operation of the embodiment.

A description will be given of the main scanning system. The recording is conducted on a recording sheet made of a photosensitive material such as a silver salt film. Numeral 2 denotes a laser source capable of generating a laser beam when activated by an electric power supply 3. A reflection mirror 4 is capable of changing the direction of the beam, while an A/0 modulator 5 is capable of modulating the beam intensity in accordance with a control signal. Numeral 6 designates an A/0 controller for controlling the A/0 modulator 5. A polygon-mirror driving motor 7 drives, under control of a polygon-mirror controller 8, a polygon mirror 70 which oscillates the modulated beam in the main scanning direction. Numeral 9 designates a beam detector which is capable of detecting the position of the beam in the main scanning direction. Upon detection of the beam position, the beam detector produces a signal BD as shown in FIG. 3. Numeral 10 denotes a reflection mirror capable of changing the direction of the beam. A frequency divider 19 is capable of passing the BD signal from the beam detector 9 or frequency divided signals which are obtained by picking up the pulses of the BD signal at predetermined intervals. Numeral 20 denotes a timing signal generator which generates a timing signal for driving the A/0 modulator upon receipt of a signal from the frequency divider 19.

A description will now given of the sub-scanning system.

The recording sheet 1 is pressed by the sub-scanning roller 11 by means of a roller 12 so as to be stably held on the sub-scanning roller 11. The sub-scanning roller 11 is driven by a sub-scanning motor 13 which is connected thereto though a coupling 14 and which operates under the control of a motor controller 15. An encoder 16 generates pulses upon detection of rotation of the sub-scanning roller 11. A laser rotary encoder having a high resolution is preferably used as the encoder 16. Numeral 17 denotes a divider which divides the pulses from the encoder 16 into pulses of smaller width. Numeral 18 denotes means for generating a motor stop signal for stopping the sub-scanning motor 13, upon comparing the number of the pulse generated by the divider 17 with previously set pulses. The motor stop signal is delivered to the motor controller 15. Numeral 21 denotes a sub-scanning motor start signal generating means capable of generating a start signal for starting the sub-scanning motor 13.

The image recording operation performed by the above-described system is as follows. The following description is based on an assumption that the recording is conducted with pixels having a pixel size of 80 $\mu m \times 80$ $\mu m$.

Figure 2:
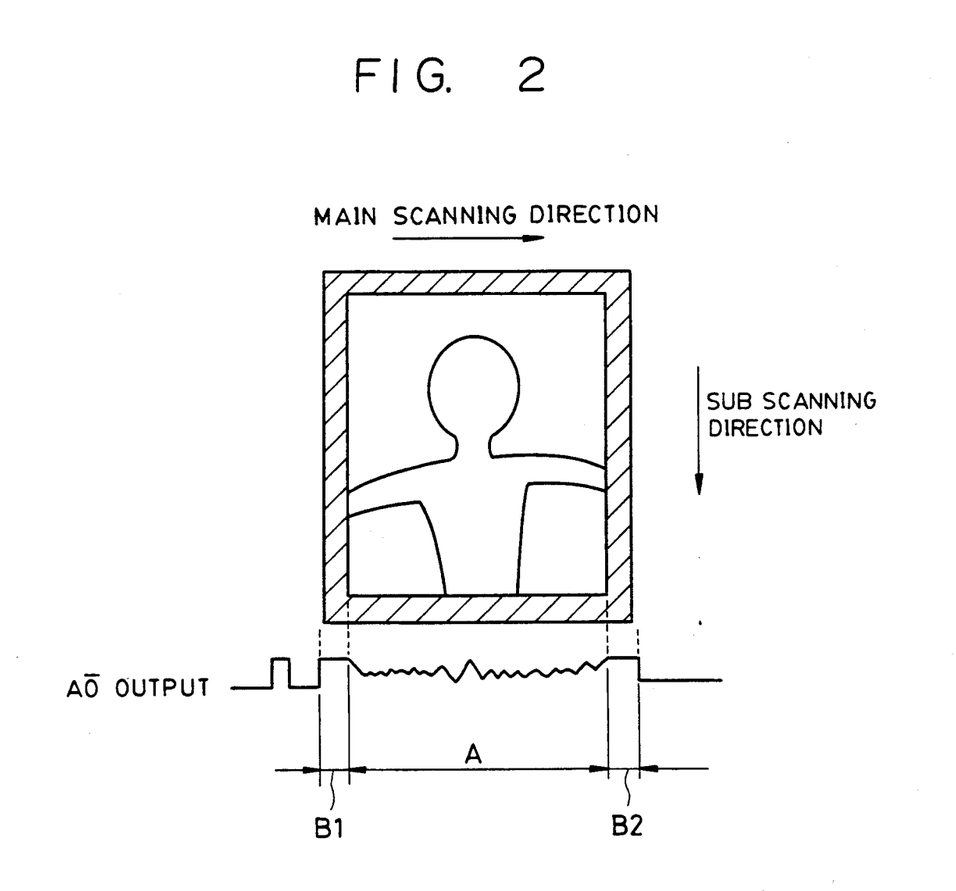
FIG. 2 is an illustration of an example of an output image, explanatory of the main scanning period for recording an image.
Figure 4:
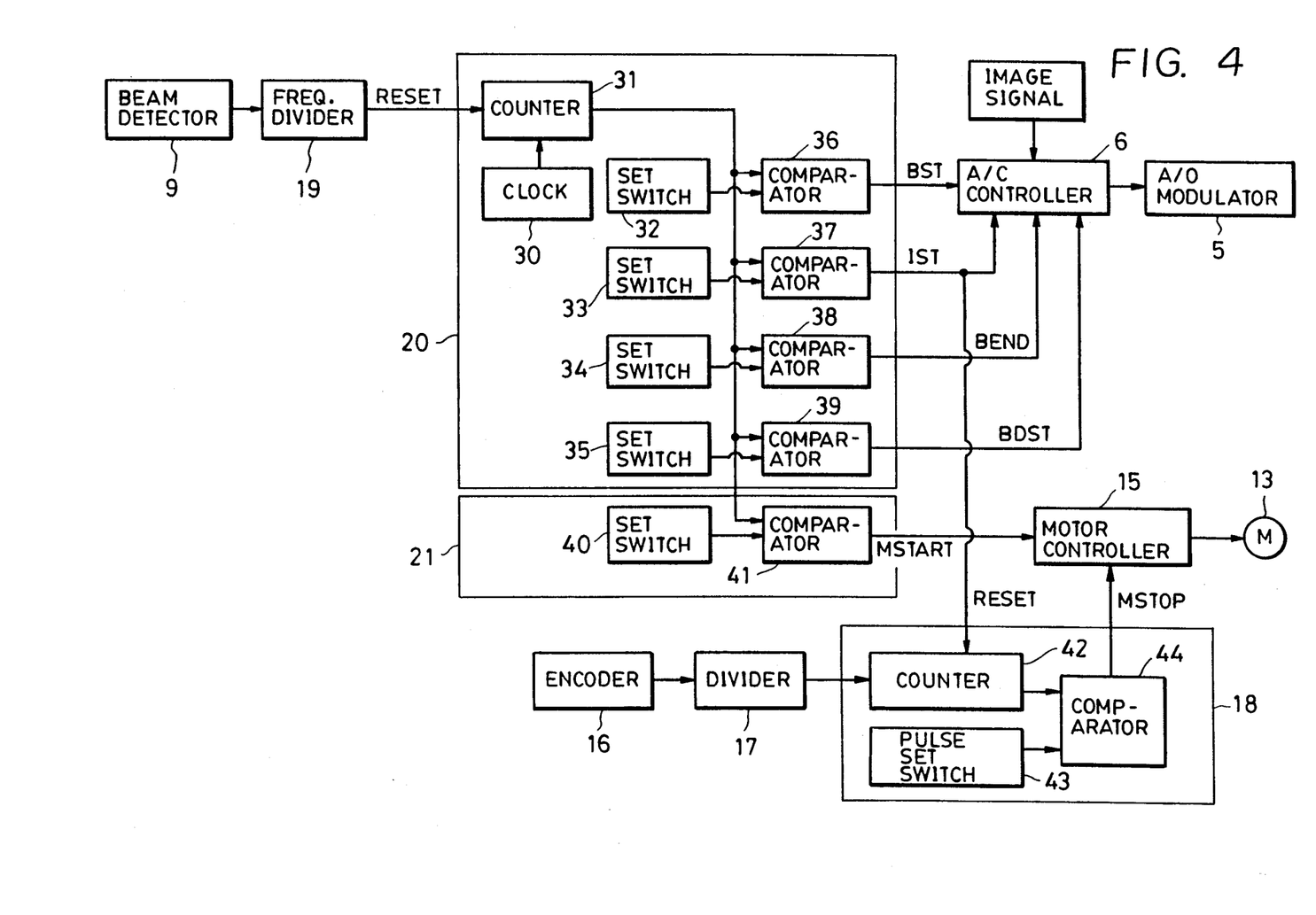
FIG. 4 is an electric block diagram of the embodiment.

Referring first to the main scanning, the laser beam emitted from the laser source 2 is intensity-modulated through the A/0 modulator 5 so as to impinge upon the polygon mirror 70 which is rotating continuously so that the beam is oscillated in the main scanning direction. Arrival of the beam at an end of the main scanning stroke is detected by the beam detector 9 so that the beam detector 9 produces the beam detection signal BD as shown in FIG. 3. The BD signal is delivered to the frequency divider so that the frequency divider 19 outputs a pulse signal having a frequency which is one of 1/1, $\frac{1}{2}$, $\frac{1}{3}$, and 1/n the frequency of the pulses of the BD signal. As shown in FIG. 4, the timing signal generating means 20 is composed of a pixel clock 30 (4 MHz), a pixel counter 31 for counting the pixel clock and set switches SW 32 to 35 and comparators 36 to 39 for generating signals such as BST, IST, BEND and BDST as shown in FIG. 3. The pixel counter 31 is reset by a signal from the frequency divider 19 and starts counting in response to a signal from the pixel clock 30. The number counted by the counter 31 is compared with the count numbers set in the set switches 32 to 35, by means of the comparators 36 to 39, and the above-mentioned signals T, IST, BEND and BDST are generated in accordance with the results of the comparison. These signals are delivered to the A/0 controller so as to be mixed with the image signals thereby controlling the A/0 modulator 5. In consequence, the beam passing through the modulator 5 is modulated to provide an A/0 output as shown in FIG. 3. The modulated beam is oscillated by the polygon mirror 70 so as to scan the recording sheet 1, thus performing the main scanning. Referring to FIG. 2, B1 denotes a border portion which is controlled by the signals BST and IST. In order to make the image area A visible more clearly, a uniform density is given to the border portion. For instance, maximum density (black) or minimum density (clear) is given to this portion. B2 represents another border portion which is controlled by an image completion signal and the signal BEND. The same level of density is given to this border portion. Thus, the period over which the portions B1, A and B2 are scanned is the image recording period, while other portions correspond to image non-recording periods.

The image output may be provided in the form of a so-called multi-format output in which a plurality of small images are recorded on a single recording sheet. In this case, the lengths of the portions A, B1 and B2 are varied in accordance with the number of the images to be recorded and the desired magnification of the image, although the total recording period for scanning the portions B1, A and B2 is unchanged.

A description will now be given of the sub-scanning operation. The sub-scanning motor 13 does not operate at least in the period in which the border portion B1, image area A, and the border portion B2 shown in FIG. 2 are main-scanned by the beam, i.e., at least in the period between the signals BST and BEND. Obviously, the sub-scanning roller 11 and the recording sheet 1 are kept in a stopped state in this period. The sub-scanning motor 13 starts to operate in response to a signal MSTART given by the motor start signal generating means 21. The motor start signal generating means 21 generates the signal RT in accordance with the output from the comparator 41 (FIG. 4) which compares the number set in the set switch 40 with the number counted by the pixel counter 31. It is to be understood, however, that the signal BEND may be used in place of the motor start signal MSTART for starting the sub-scanning motor 13. As the sub-scanning motor 13 starts to rotate the sub-scanning roller 11 rotates to feed the recording sheet 1 Meanwhile, the encoder 16 connected to the sub-scanning roller 11 generates a pulse signal. When the recording sheet 1 has traveled 80 μm in the sub-scanning direction, the motor stop signal generating means 18 delivers a motor stop signal MSTOP to the sub-scanning motor 13 through the motor controller 15, so that the sub-scanning motor 13 stops, thereby stopping the feeding of the recording sheet 1. The motor-stop signal generating means includes a counter 42 (FIG. 4) for counting the pulses from the divider 17, a pulse number setting switch 43 for calculating and setting the number of pulses to be derived from the divider 17 in response to the 80 μm feed of the recording sheet, and a comparator 44 which generates the motor stop signal MSTOP upon comparing the number counted by the counter 42 with the number set in the pulse number setting switch 43.

It is assumed here that the diameter of the sub-scanning roller is 22.92 mm, that the encoder 16 is a laser rotary encoder having a resolution of 81000 pulses per rotation and that a hexa-decimal divider is used as the divider 17. In such a case, a 80 μm feed of the recording sheet 1, i.e., the feed of the recording sheet 1 by one pitch of the main scanning, causes the encoder 16 to produce pulses the number of which is given as $81000 \times 0.08/22.9\pi = 90$ (pulses). Thus, the diver 17 produces $90 \times 16 = 1440$ pulses. Therefore, if the number of pulses set in the pulse number setting switch 43 is 1440, the motor stop signal generating means 18 generates the motor stop signal MSTOP when the recording sheet 1 is fed by 80 μm, so that the sub-scanning motor 13 is stopped to stop the recording sheet 1 precisely after the 80 μm feed. The period over which the sub-scanning motor 13 is stopped is the image recording period in the main scanning, i.e., in the period between the signal BST and the signal BEND, and the operation of the sub-scanning. The operation of the sub-scanning motor is conducted in the non-recording period.

A discussion will now be given on the period of driving of the sub-scanning motor.

It is assumed that the polygon mirror 70 has six surfaces, while the rotation speed of the polygon motor 7 is 5000 rpm, and that the pixel size is 80 μm. In this case, the scanning period for one surface of the polygon mirror is calculated as $60/(5000 \times 6) \times 10^3 = 2$ ms. In general, the effective region (efficiency) of the portion effectively used for the recording in the period of one scan provided on a surface of the hexagonal mirror is about 60% or so. Thus, the effective image recording period is given as $2 \text{ ms} \times 0.6 = 1.2$ ms. Thus, the non-recording period in which the sub-scanning motor is allowed to operate is given by $2 \text{ ms} - 1.2 \text{ ms} = 0.8$ ms.

The sub-scanning is conducted safely if the 80 μm feed of the recording sheet can be completed within this non-recording period. If such a non-recording period is too short for effecting the 80 μm feed of the recording sheet, it is possible to arrange the design such that the recording is conducted by using every two or every three surfaces of the hexagonal mirror. When every two or every three surfaces of the hexagonal mirror are used for the main scanning, the non-recording period can be prolonged to 2.8 ms or 4.8 ms which is enough to enable the recording sheet to be fed by 80 μm. When the operation is conducted in accordance with the timing chart shown in FIG. 3, the BD signal is demultiplied by 2, i.e., divided into ½ frequency, so that the counter 31 is reset by every other BD signal, so that the main scanning is effected by every two surfaces of the hexagonal mirror, thus prolonging the non-recording period. It will be obvious that main scanning by every three surfaces of the hexagonal mirror can be accomplished by demultiplying the BD signal by 3 using the frequency divider 19. Alternatively, sufficient time margin for operating the sub-scanning motor can be obtained by using a polygonal mirror having three or two reflecting surfaces. It is also possible to obtain the margin for the operation of the sub-scanning motor by lowering the rotation speed of the polygon mirror, if high stability and precision of rotation are obtained at such a reduced rotation speed.

The recording of an image can be conducted by the combination of the main scanning and the sub-scanning which are conducted in the manners described hereinbefore. The quality of the recorded image is largely influenced by the precision of the sub-scanning.

In the described embodiment, the precision of the sub-scanning depends on the resolution of the encoder 16 and the stopping precision of the sub-scanning motor 13.

A discussion will now given of the resolution of the encoder 16, i.e., the resolution of the divider 17. As stated before, it is assumed here that the pitch of the main scanning is 80 μm, that the diameter of the sub-scanning roller is 22.92 mm, that the encoder 16 has a resolution of 81000 pulses per rotation, and that a hexa-decimal divider is used as the divider 17.

In this case, the divider 17 produces pulses of a number given by $81000 \times 16 = 1296000$ pulses per rotation of the encoder 16.

Therefore, the amount of feed of the recording sheet per one pulse is calculated as $22.92 \times \pi/1296000 = 5.56 \times 10^{-5}$ mm, so that the resolution of one pulse for the main scanning pitch (80 μm) is calculated as $5.56 \times 10^{-5}/0.08 \times 100 = 0.07\%$.

As stated before, a change in the main scanning pitch in the amount of 0.1% is visually recognized and cannot be accepted when the requirement for image quality is specifically high. In the described embodiment, however, the resolution per one pulse is as small as 0.07% which well satisfies the demand even when the requirement for the quality of the image is strict.

In the described embodiment of the present invention, any fluctuation in the speed of rotation of the sub-scanning roller does not affect the precision of the sub-scanning. This widens the selection of the sub-scanning motor as the driving source, thus making it possible to use less-expensive motors. In addition, the precision of the sub-scanning is not affected by any fluctuation of rotation speed of the sub-scanning roller caused by a change in the load applied to the sub-scanning roller and the recording sheet, unless a slip is caused between the sub-scanning roller and the recording sheet. It is thus possible to obtain a sub-scanning mechanism which has a high stability against fluctuation in the load level. This makes it possible to employ a mechanism which tends to cause a load fluctuation, e.g., a mechanism for deflecting the recording sheet by a guide plate or the like while the recording sheet is still in the recording zone or a sheet guide mechanism which allows mutual contact between successive recording sheets, without impairing the precision in the sub-scanning. It is therefore possible to realize a compact construction of the apparatus while attaining a high precision of the sub-scanning.

Figure 5:
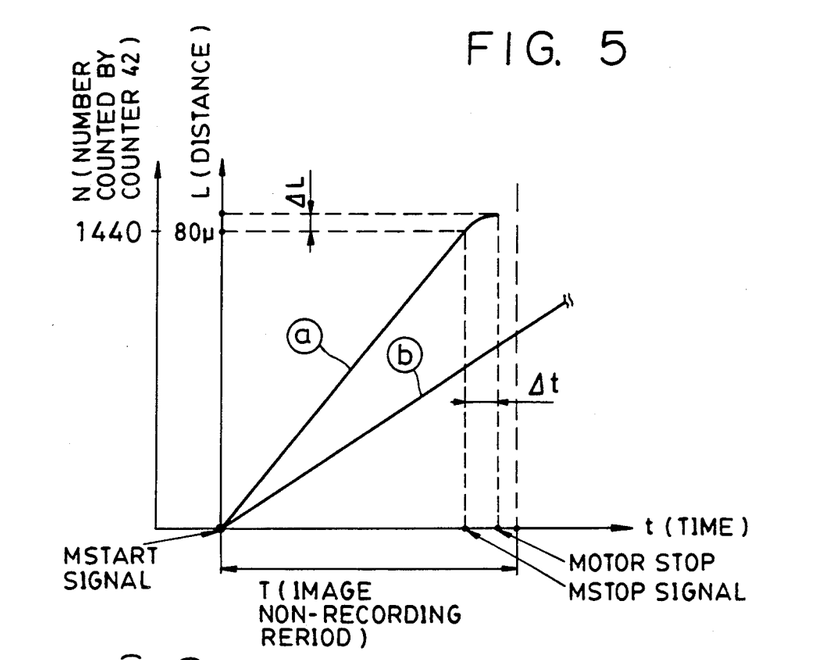
FIGS. 5 and 6 are illustrations of the stopping precision of a sub-scanning motor.
Figure 6:
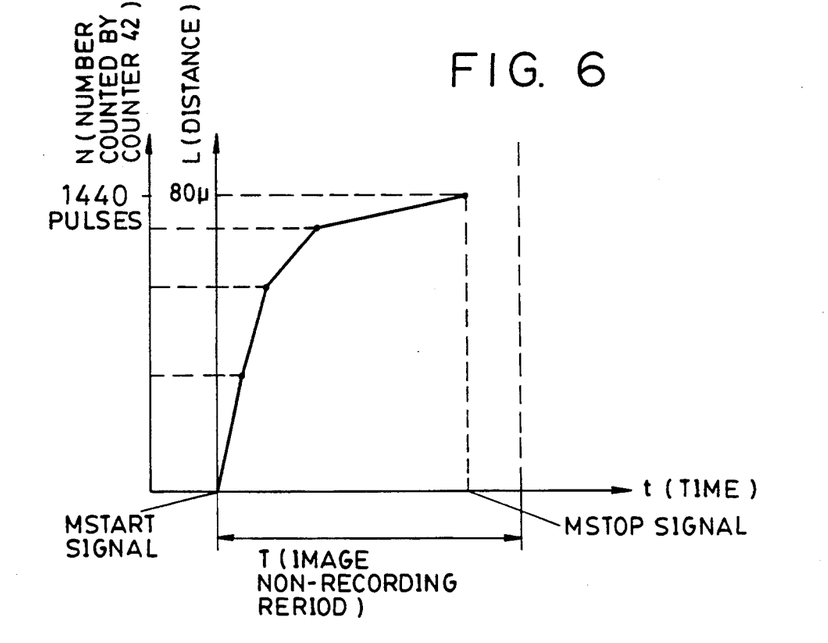

A discussion will now be given of the precision of the control for stopping the sub-scanning motor 13, with specific reference to FIGS. 5 and 6. Referring to FIGS. 5 and 6, the abscissa represents time, while the ordinate represents the travel or amount of feed of the recording sheet, as well as the number counted by the counter 42 which counts the pulses derived from the frequency divider 17. FIG. 5 illustrates the case where the recording sheet 1 is moved at a constant speed in the direction of the sub-scanning by an amount equal to the pitch (80 $\mu$m) of the main scanning. In FIG. 5, a curve (a) shows an operation in which the 80 $\mu$m feed of the recording sheet 1 and the stopping of the sub-scanning motor are performed within the image non-recording period. In this case, a delay time $\Delta t$ is inevitably produced until the motor is completely stopped after generation of the motor stop signal MSTOP, due to inertia of the sub-scanning roller and other members. This means that the recording sheet 1 is fed by an amount which is $\Delta L$ greater than the expected feed amount of 80 $\mu$m. It would be possible to advance the timing of generation of the motor stop signal MSTOP by an amount corresponding to the delay time $\Delta t$ so as to make the feed amount fall near the expected feed amount of 80 $\mu$m. Actually, however, the factors $\Delta L$ and $\Delta t$ are variable factors so that it is difficult to obtain a required high precision of the stopping control with such a method. A curve (b) in FIG. 5 illustrates the case where the sub-scanning motor is operated at a low constant speed so as to reduce the delay time $\Delta t$ substantially to zero, considering the inertia of the sub-scanning rollers and other associated members. With such a low speed, however, it is impossible to effect the required 80 $\mu$m feed within the non-recording period.

In order to obviate the above-described problem, according to the present invention, the speed of feed of the recording sheet in each feeding cycle is varied in a manner as shown in FIG. 6. More specifically, the number counted by the counter 42 is picked up in a plurality of stages, e.g., four stages in the embodiment shown in FIG. 6, and the speed of the sub-scanning motor is varied by using the signals of the respective stages as triggers. More specifically, the sub-scanning motor is operated at high speed in the beginning portion of the feed cycle and is decelerated in a stepped manner in response to the successive stage signals. In the final portion of the feed cycle, the sub-scanning motor operates at such a low speed as to enable the sub-scanning motor to stop without substantial delay time after the generation of the motor stop signal MSTOP despite the inertia of the sub-scanning motor and other members. By progressively decreasing the sub-scanning speed in each sub-scanning period, it is possible to attain a high precision of stopping control of the sub-scanning motor and, hence, to shorten the period T (non-recording period), i.e., the recording cycle time.

The described embodiment employs beam generating means 2, 3 capable of generating a beam of a constant intensity, in combination with an A/0 modulator which conducts modulation of the beam intensity. This, however, is only illustrative and the apparatus of the present invention can employ a semiconductor laser which is capable of producing a modulated output laser beam. It is also to be pointed out that the divider 17 may be omitted provided that the encoder 16 has a sufficiently high resolution. It will be obvious also that the polygon mirror used as the main scanning optical means in the described embodiment can be substituted by other means such as a galvano-mirror.

Furthermore, the invention can be embodied as a rotary drum type recording apparatus in which a rotary drum having a photosensitive layer is main-scanned in the axial direction while the sub-scanning is effected by a rotation of the drum, although the described embodiment is a recording apparatus of the type in which a photosensitive recording film is used as the recording member.

Furthermore, although the invention has been described with reference to an image recording apparatus, it is to be understood that the invention can equally be applied to an image reading apparatus which reads an image by two-dimensional scanning with a beam. The invention, when applied to such an image reading apparatus, enables reading of an original image with a high degree of precision.

WHAT IS CLAIMED IS:

1. A light beam scanning type recording apparatus comprising:
    main scanning means having a light beam scanning optical system including a mirror means and capable of performing main scanning of a recording member with a light beam;
    sub-scanning means for moving the recording member relative to said main scanning means in a direction which crosses a direction of the main scanning, thereby performing a sub-scanning;
    period setting means for setting a recording period in which a recording region on the recording member is scanned by the light beam from said light beam scanning optical system, and a non-recording period in which the light beam scans a non-recording region of the recording member other than said recording region; and
    control means for maintaining said sub-scanning means inoperative in the recording period to enable recording and for allowing said sub-scanning means to operate in the non-recording period thereby effecting the sub-scanning in the non-recording period.

2. An apparatus according to claim 1, further comprising light beam detecting means disposed on the path of the main scanning at a location outside said recording region, for detecting the light beam and providing an output signal corresponding to the detection, and wherein said period setting means is operative in response to the output signal from said light beam detecting means.

3. An apparatus according to claim 2, wherein the output signal from said light beam detecting means is used as a horizontal synchronizing signal.

4. An apparatus according to claim 1, wherein said sub-scanning means includes a roller contacting said recording member and capable of feeding said recording member, and a driving motor for driving said roller.

5. An apparatus according to claim 4, further comprising an encoder for detecting an amount of rotation of said roller.

6. An apparatus according to claim 5, wherein said encoder comprises a laser rotary encoder.

7. An apparatus according to claim 1, wherein said control means is capable of controlling said sub-scanning means so as to vary a speed of the sub-scanning in each of a plurality of sub-scanning cycle.

8. An apparatus according to claim 7, wherein the sub-scanning speed is progressively decreased in each sub-scanning cycle.

9. An apparatus according to claim 1, further comprising a light source for generating the light beam as a recording light beam.

10. An apparatus according to claim 9, further comprising modulating means for modulating the light beam from said light source in accordance with recording signals.

11. An apparatus according to claim 10, wherein said modulating means includes an acousto-optical (A/0) modulator.

12. An apparatus according to claim 11, wherein said recording member comprises a photosensitive recording film.

13. An apparatus according to claim 1, wherein said main scanning means, said sub-scanning means, said period setting means and said control means are capable of recording a plurality of images in a multi-format fashion on said recording member.

14. An image scanning apparatus comprising:
a light beam scanning optical system including a mirror, for scanning the light beam;
light source means capable of generating a light beam;
main scanning means for conducting a main scanning of an object surface with the light beam scanned by said light beam scanning optical system;
sub-scanning means for moving the object surface relative to said main scanning means in a direction which crosses a direction of the main scanning;
period setting means for setting an effective period in which an effective region on the object surface is scanned by said light beam from the light beam scanning optical system, and an ineffective period in which the light beam scans an ineffective region of the object surface other than the effective region; and
control means for maintaining said sub-scanning means inoperative in the effective period to enable recording or reading of an image, and for allowing said sub-scanning means to operate in the ineffective period thereby effecting the sub-scanning in the ineffective period.

* * * * *

UNITED STATES PATENT AND TRADEMARK OFFICE
CERTIFICATE OF CORRECTION

Page 1 of 2

PATENT NO. : 5,057,943
DATED : October 15, 1991
INVENTOR(S) : Kazuhisa Takahashi It is certified that error appears in the above-indentified patent and that said Letters Patent is hereby corrected as shown below:

Title page, item,

[57] ABSTRACT
    Line 5, "subscanning" should read --sub-scanning--.

COLUMN 1:
    Line 37, "(A/0" should read --(A/O)--.

COLUMN 2:
    Line 60, "a" should be deleted.

COLUMN 3:
    Line 33, "sheet" should read --sheet 1--;
    Line 37, "A/0" should read --A/O--;
    Line 40, "A/0" should read --A/O-- (both occurrences);
    Line 51, "frequency divided" should read --frequency-divided--; and
    Line 55, "A/0" should read --A/O--.

COLUMN 4:
    Line 17, "A/0" should read --A/O--;
    Line 38, "signals T," should read --signals BST,--;
    Line 40, "A/0" should read --A/O--;
    Line 42, "A/0" should read --A/O--; and
    Line 44, "A/0" should read --A/O--.

COLUMN 5:
    Line 17, "rotate the": should read --rotate, the--;
    Line 18, "sheet 1 Meanwhile" should read -- sheet 1. Meanwhile--; and
    Line 43, "diver 17" shoUld read --divider 17--.

COLUMN 7:
    Line 8, "e.g.,a" should read --e.g., a--.

UNITED STATES PATENT AND TRADEMARK OFFICE
CERTIFICATE OF CORRECTION

PATENT NO. : 5,057,943

DATED : October 15, 1991

INVENTOR(S) : Kazuhisa TAKAHASHI

It is certified that error appears in the above-identified patent and that said Letters Patent is hereby corrected as shown below:

COLUMN 8:
  Line 7, "A/0" should read --A/O--; and
  Line 34, "WHAT IS CLAIMED IS:" should read --What is claimed is:--.

COLUMN 9:
  Line 13, "cycle." should read --cycles.--; and
  Line 26, "(A/0)" should read --(A/O)--.

COLUMN 10:
  Line 28, "period" should read --period,--.

Signed and Sealed this

Fifteenth Day of June, 1993

Attest:

MICHAEL K. KIRK

Attesting Officer

Acting Commissioner of Patents and Trademarks